United States Patent
Lee et al.

(10) Patent No.: US 8,769,476 B2
(45) Date of Patent: Jul. 1, 2014

(54) METHOD OF PERFORMING CIRCUIT SIMULATION AND GENERATING CIRCUIT LAYOUT

(75) Inventors: Hui Yu Lee, Hsinchu (TW); Feng Wei Kuo, Zhudong Township (TW); Jui-Feng Kuan, Zhubei (TW); Simon Yi-Hung Chen, Hsinchu (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 0 days.

(21) Appl. No.: 13/464,401

(22) Filed: May 4, 2012

(65) Prior Publication Data

US 2013/0298091 A1 Nov. 7, 2013

(51) Int. Cl.
*G06F 17/50* (2006.01)

(52) U.S. Cl.
USPC .......................................... 716/139; 716/104

(58) Field of Classification Search
CPC .................................. G06F 17/50; G06F 15/04
USPC .................................................. 716/104, 139
See application file for complete search history.

(56) References Cited

U.S. PATENT DOCUMENTS

| | | | |
|---|---|---|---|
| 7,337,420 B2 * | 2/2008 | Chidambarrao et al. | 716/112 |
| 7,542,891 B2 * | 6/2009 | Lin et al. | 703/14 |
| 2010/0050138 A1 | 2/2010 | Chidambarrao et al. | |

* cited by examiner

*Primary Examiner* — Thuan Do

(74) *Attorney, Agent, or Firm* — Lowe Hauptman & Ham, LLP

(57) ABSTRACT

A method of generating a circuit layout of an integrated circuit includes generating layout geometry parameters for at least a predetermined portion of an original netlist of the integrated circuit. A consolidated netlist including information from the original netlist and the layout geometry parameters is generated. Then, the circuit layout is generated based on the consolidated netlist.

20 Claims, 6 Drawing Sheets

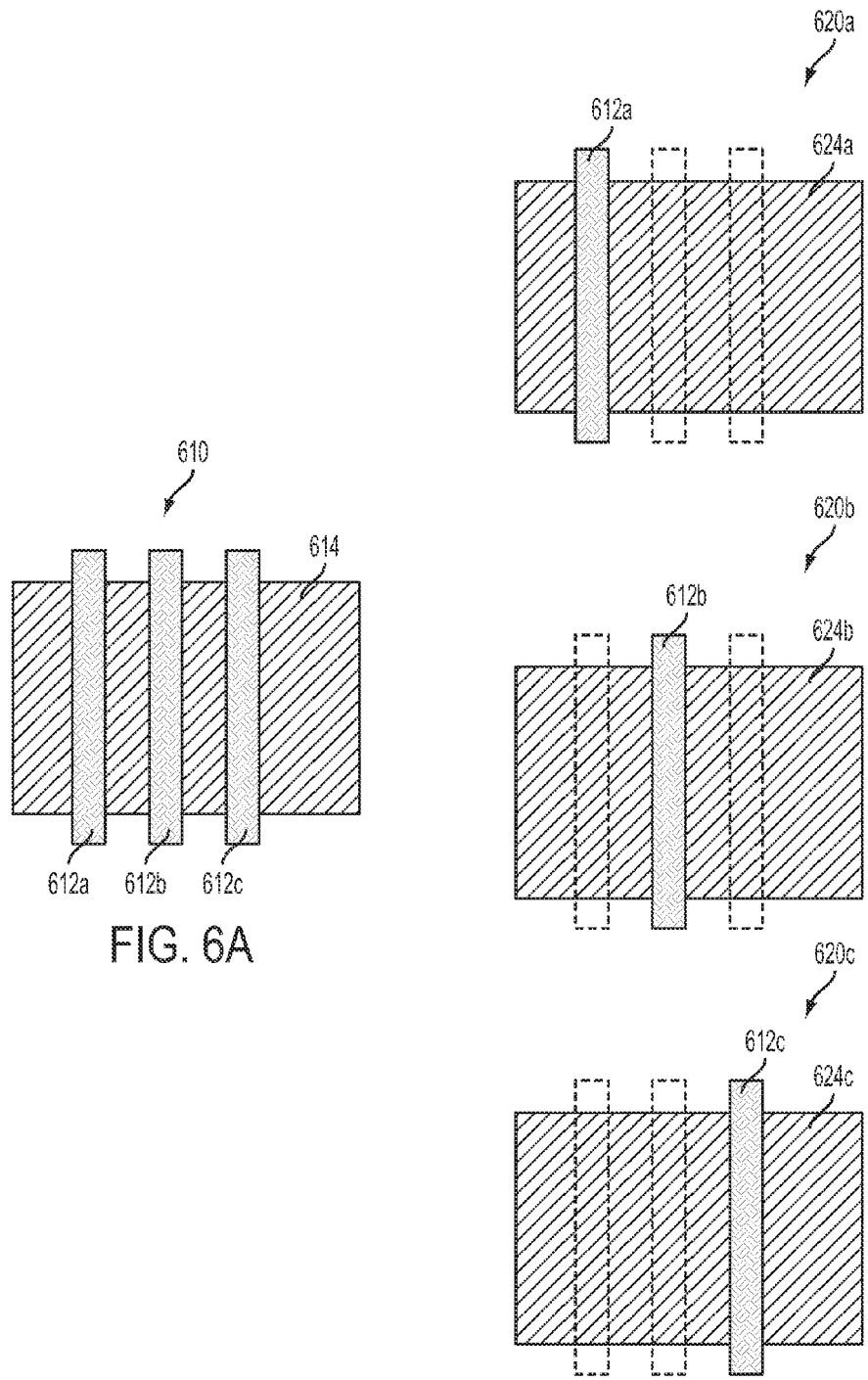

US 8,769,476 B2

METHOD OF PERFORMING CIRCUIT SIMULATION AND GENERATING CIRCUIT LAYOUT

BACKGROUND

In the course of Integrated Circuit (IC) development, functional density (i.e., the number of interconnected devices per chip area) has generally increased while geometry size (i.e., the smallest component or line that can be created using a fabrication process) has decreased. This scaling down process generally provides benefits by increasing production efficiency and lowering associated costs. At the same time, the scaling down process also increases the significance of layout-dependent effects (LDEs). LDEs include oxide diffusion (OD) layer stress, well stress, and polysilicon stress and impact device characteristics, such as carrier mobility, output impedance, trans-conductance, and/or threshold voltage of a transistor device. The level of the LDEs depends on a dimension of electrical components and the relevant distance among various semiconductor structures. Usually, the LDEs are evaluated with sufficient precision only after the generation of a circuit layout of a circuit design and the extraction of LDE-related parameters based on the circuit layout.

DESCRIPTION OF THE DRAWINGS

One or more embodiments are illustrated by way of example, and not by limitation, in the figures of the accompanying drawings, wherein elements having the same reference numeral designations represent like elements throughout and wherein:

FIG. 6A is a top-view diagram of an example multi-finger transistor in accordance with one or more embodiments;

FIG. 6B is a top-view diagram of a plurality of single-finger transistors derived from the example multi-finger transistor of FIG. 6A in accordance with one or more embodiments.

DETAILED DESCRIPTION

Figure 1:
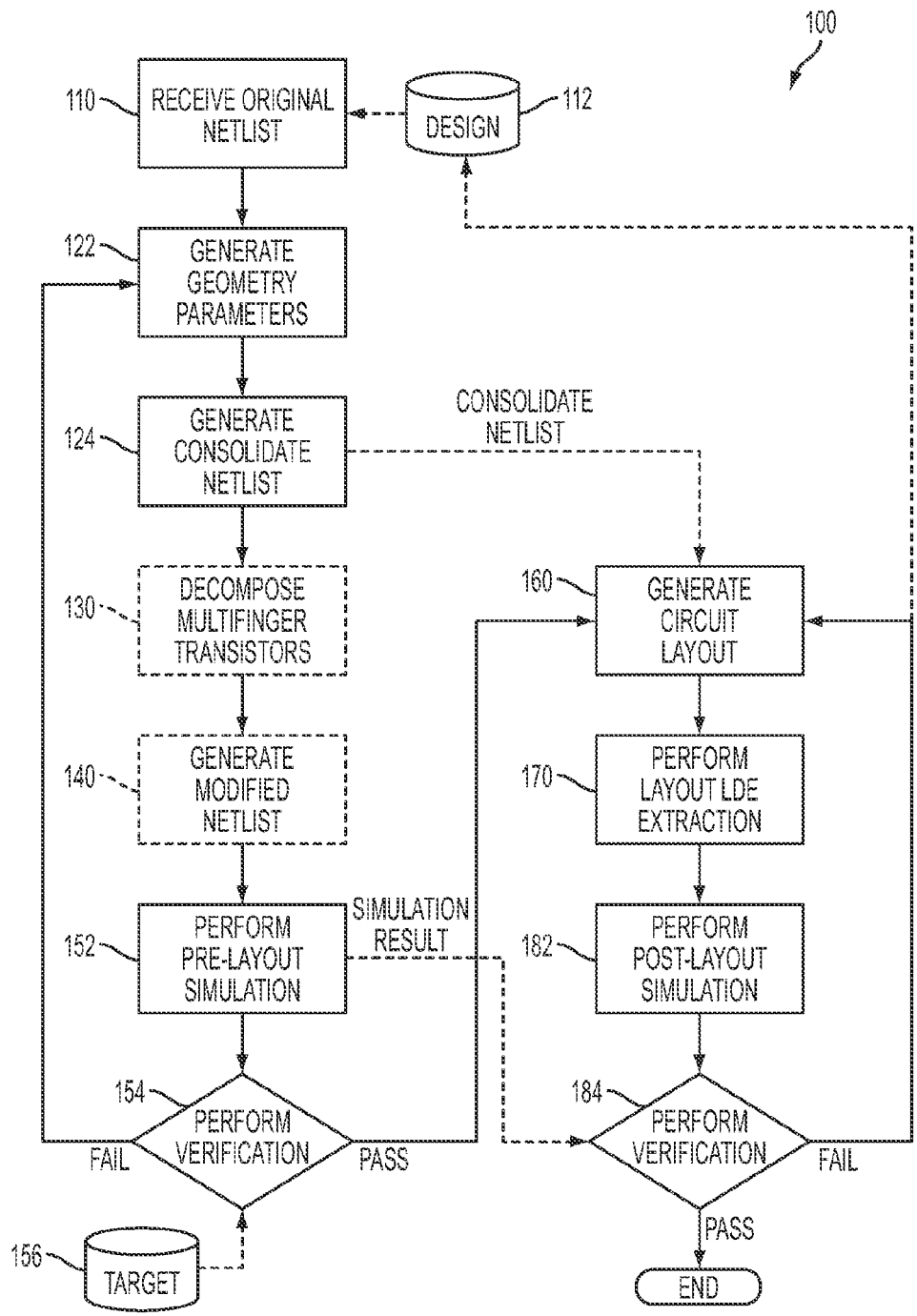
FIG. 1 is a flow chart of a method of generating a circuit layout of a circuit design in accordance with one or more embodiments.

It is understood that the following disclosure provides one or more different embodiments, or examples, for implementing different features of the disclosure. Specific examples of components and arrangements are described below to simplify the present disclosure. These are, of course, examples and are not intended to be limiting. In accordance with the standard practice in the industry, various features in the drawings are not drawn to scale and are used for illustration purposes only.

Moreover, spatially relative terms, for example, "lower," "upper," "horizontal," "vertical," "above," "below," "up," "down," "top," "bottom," "left," "right," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

FIG. 1 is a flow chart of at least a portion of a method 100 of generating a circuit layout of a circuit design 112 in accordance with one or more embodiments. It is understood that additional processes may be performed before, during, and/or after the method 100 depicted in FIG. 1, and that some other processes may only be briefly described herein. In some embodiments, the method 100 is, partially or entirely, performed by a computer system 700 (FIG. 7) having a hardware controller 710 (FIG. 7) executing a set of computer readable instructions (such as computer program code 722 in FIG. 7).

As depicted in FIG. 1, in operation 110, the circuit design 112 of the integrated circuit 200 is received by the controller 710. In some embodiments, the circuit design 112 of the integrated circuit 200 is an electronic file compiled in a circuit schematic format (i.e., an original circuit schematic) that is recognizable by a schematic circuit design software program. The controller 710 is capable of receiving the original circuit schematic and converting the original circuit schematic into an original netlist recognizable by a predetermined simulation software program. A netlist is a text description of a circuit design, such as the circuit design 112, defining instance parameters for modeling a device and interconnection between the device and other nodes or devices. In some embodiments, the circuit design 112 of the integrated circuit 200 is presented as an electronic file compiled in a netlist format (i.e., the original netlist), and thus the format-conversion by the controller 710 is omitted. In some embodiments, the predetermined simulation software program is HSPICE or PSPICE. In some embodiments, the predetermined simulation software program is capable of recognizing netlists compatible to Berkeley Short-channel IGFET Model (BSIM) standard. In at least one embodiment, the original netlist is recognizable by HSPICE and compatible with BSIM standard version 4.5 or later.

Figure 2:
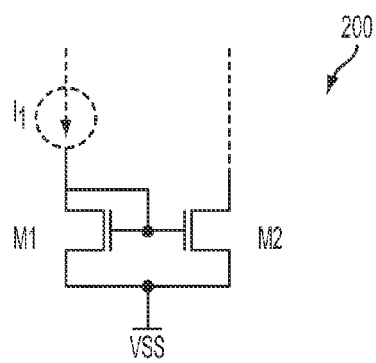
FIG. 2 is a schematic diagram of a portion of an integrated circuit corresponding to a circuit design in accordance with one or more embodiments.

In operation 122, the controller 710 generates a set of layout geometry parameters for at least a predetermined portion of the received original netlist of the integrated circuit 200, such as the description corresponding to transistors M1 and M2 in FIG. 2. The set of layout geometry parameters includes restrictions to be followed for generating a circuit layout for the integrated circuit 200 in a later stage. The layout geometry parameters are set to reduce simulation results between a pre-layout simulation (e.g., operation 152) and a post-layout simulation (e.g., operation 182). In at least one embodiment, layout geometry parameters for analog circuits and timing sensitive logic circuits in the integrated circuit 200 are generated in operation 122. In some embodiments, only layout geometry parameters for analog circuits in the integrated circuit 200 are generated in operation 122. In some embodiments, layout geometry parameters for every component in the integrated circuit 200 are generated in operation 122 of FIG. 1.

In operation 124, a consolidated netlist is generated by combining the original netlist and the layout geometry parameters generated during operation 122. In some embodiments, LDE-related instance parameters in the original netlist are omitted, and the layout geometry parameters generated in operation 110 are inserted for each declared device. In some embodiments, in order to make the consolidated netlist recognizable by the predetermined simulation software program, the layout geometry parameters are added as "comments" of the consolidated netlist or in a form that will be ignored by the predetermined simulation software program. In some embodiments, the layout geometry parameters follow an asterisk or an indicative character/string, which indicates that the text in the same line after the asterisk or the indicative character/string is to be ignored by the predetermined simulation software program.

In operation 130, if a transistor declared or described in the consolidated netlist is a multi-finger transistor, the description for the transistor in the consolidated netlist is further replaced (i.e., decomposed) with description for a plurality of single-finger transistors in the consolidated netlist. In some embodiments, the decomposition of the multi-finger transistor in operation 130 increases the accuracy of circuit simulation with regard to parasitic resistance-capacitance effects. In some embodiments, operation 130 is omitted.

In operation 140, a modified netlist including new LDE-related instance parameters recognizable by the simulation software program is generated based on the consolidated netlist (if operation 130 is omitted) or the decomposed consolidated netlist (if operation 130 is performed). The layout geometry parameters are translated into corresponding LDE-related instance parameters that are directly accessible by the simulation software program. In some embodiments, the LDE-related instance parameters are compatible with BSIM standard version 4.5.

In operation 152, a pre-layout simulation is performed by executing the predetermined simulation software program based on the modified netlist derived from the consolidated netlist. In at least one embodiment, the pre-layout simulation is performed by executing a program such as HSPICE or PSPICE, and the modified netlist is compatible with BSIM standard version 4.5. In some embodiments, the simulation software program used for the pre-layout simulation is capable of processing the layout geometry parameters, and operations 130 and 140 are thus omitted.

In operation 154, the result of the pre-layout simulation performed in operation 152 is compared with a set of predetermined performance targets. If there is a discrepancy between the result of the pre-layout simulation and the set of predetermined performance targets greater than a predetermined first tolerance, the process returns to operation 122. The hardware controller 710, either in response to an input of a circuit designer of the integrated circuit 200 or according to an instruction of a software program being executed for performing the disclosed method 100, generates a set of revised layout geometry parameters to replace the previous set of layout geometry parameters. If the discrepancy between the result of the pre-layout simulation and set of predetermined performance targets is within the predetermined first tolerance, the process moves on to operation 160.

In operation 160, following the definitions provided and restrictions imposed by the layout geometry parameters in the consolidated netlist, a circuit layout of the integrated circuit 200 is generated. After the generation of the circuit layout, in operation 170, a set of LDE parameters is extracted based on the circuit layout generated in operation 160. In operation 182, a post-layout simulation is performed based on the extracted LDE parameters. In some embodiments, operation 170 and operation 182 are performed by executing a post-layout simulation software program that is different from the simulation software program used in operation 152. In some embodiments, operation 170 is performed by executing a layout parasitic parameters extraction program, and operation 182 is performed by the simulation software program used in operation 152 based on the extracted parasitic parameters from operation 170.

In operation 184, after the performance of the post-layout simulation, a result of the post-layout simulation is compared with the result of the pre-layout simulation from operation 152. If a discrepancy between the result of the post-layout simulation and the result of the pre-layout simulation is greater than a predetermined second tolerance, the process returns to operation 160, where the circuit designer or a layout automation software program revises the circuit layout. In some embodiments, instead of returning to operation 160, the circuit design 112 is considered disapproved and a revised circuit design is generated to replace the previous circuit design 112. If the discrepancy between the result of the post-layout simulation and the result of the pre-layout simulation is not greater than the predetermined second tolerance, the generated circuit layout is considered acceptable and is used to manufacture a physical integrated circuit as intended by the original netlist.

According to the method 100, the pre-simulation (operation 152) and the circuit layout (operation 160) are both performed based on the layout geometry parameters provided in the consolidated netlist, and the pre-layout simulation thus has considered layout-dependent effects provided the circuit layout is consistent with the layout geometry parameters set in operation 122. Therefore, compared with a pre-layout simulation without considering the layout-dependent effects or merely based on estimated LDE-related parameters provided in the original netlist, a gap between the results of the pre-layout simulation and the post-layout simulation according to the method 100 is reduced.

In some embodiments, an iteration among layout generation (operation 160), LDE extraction (operation 170) and the post-layout simulation (operation 182) is more time consuming than an iteration among the layout geometry parameter generation (operation 122), the consolidated netlist generation (operation 124), and the pre-layout simulation (operation 154). By closing the gap between the results of the pre-layout simulation and the post-layout simulation using the consolidated netlist, the verification and refinement of the circuit design 112 and the generation of a corresponding circuit layout are more efficiently performed before the layout is generated.

The example integrated circuit 200 and details of the method 100 are described below to further facilitate the explanation of the method 100.

FIG. 2 is a schematic diagram of a portion of the example integrated circuit 200 corresponding to the circuit design 112 in accordance with one or more embodiments. The integrated circuit 200 includes two N-channel Metal-Oxide Semiconductor (NMOS) transistors M1 and M2 connected as a current mirror and a current source I1. A drain terminal of the NMOS transistor M1 is coupled to a gate terminal of the NMOS transistor M2, the gate terminal of the NMOS transistor M2, and the current source I1. Source terminals of the NMOS transistors M1 and M2 are coupled to a negative power supply VSS.

For describing the circuit depicted in FIG. 2, in conjunction with operation 110 in FIG. 1, an example original netlist includes the device declaration and corresponding instance parameters as follows:

M1 (net01 net01 net02 net03) nch_mac 1=80n w=240.0n
multi=1 nf=1 sd=140.0n ad=2.64e-14 as=2.64e-14
pd=700n ps=700n nrd=0.386341 nrs=0.386341
sa=110.0n sb=110.0n sa1=110.0n sa2=110.0n
sa3=110.0n sa4=110.0n sb1=110.0n sb2=110.0n sb3=110.0n spa=3u spa1=3u spa2=3u spa3=3u
sap=1.00025u spba=1.73436u sapb=577.831n
spba1=1.74128u M2 (net04 net01 net02 net03) nch_mac 1=80n w=1.2u
multi=1 nf=5 sd=140.0n ad=9.36e-14 as=9.36e-14
pd=2.22u ps=2.22u nrd=0.082297 nrs=0.082297
sa=336.798n sb=336.798n sa1=190.074n
sa2=310.915n sa3=516.179n sa4=308.67n
sb1=190.074n sb2=310.915n sb3=516.179n
spa=238.049n spa1=194.541n spa2=151.427n
spa3=161.158n sap=240.466n spba=196.475n
sapb=336.445n spba1=200.015n The instance parameters are compatible with BSIM standard version 4.5. Instance parameters sa, sb, sa1, sa2, sa3, sa4, sb1, sb2, sb3, spa, spa1, spa2, spa3, sap, spba, sapb, and spba1 are LDE-related parameters usable to simulate the stresses from various semiconductor structures to the defined transistor device. However, in the original netlist, the LDE-related parameters includes estimated values set by the circuit designer. The definition of the above-identified instance parameters is provided in BSIM standard version 4.5 and is known to a person of ordinary skill in the field of transistor modeling.

Figure 3:
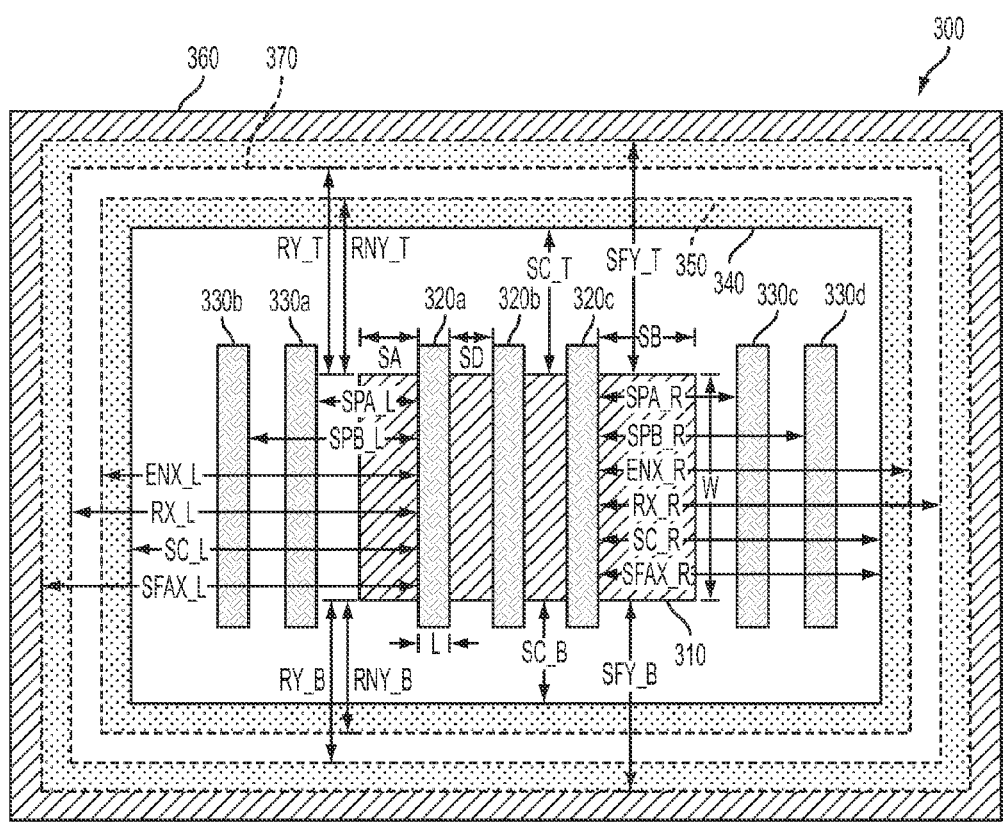
FIG. 3 is a top-view diagram of an example transistor layout in accordance with one or more embodiments.

FIG. 3 is a top-view diagram of an example transistor layout 300 in accordance with one or more embodiments. The transistor layout 300 includes an OD region 310, a multi-finger gate structure including a plurality of polysilicon structures (i.e., polysilicon "fingers") 320a-320c, a plurality of neighboring polysilicon structures 330a-330d, a well region boundary 340, and a CESL boundary 350. Also, other components in the transistor layout 300 are simplified as a ring of other surrounding OD regions 360 and other surrounding CESL boundaries 370. Usable layout geometry parameters for implementing method 100 in accordance with one or more embodiments are defined as follows.

In some embodiments, usable layout geometry parameters include length of diffusion (LOD) geometric parameters, well proximity effect (WPE) geometric parameters, poly space effect (PSE) geometric parameters, OD space effect (OSE) geometric parameters, or boundary effect (BE) geometric parameters. The above-mentioned layout geometry parameters include various lengths and gap widths among different semiconductor structures for calculating the effects caused by the dimension of an OD region, a well region, a neighboring polysilicon structure, and/or a contact etch stop layer (CESL) structure covering the declared device.

LOD geometric parameters include parameters SA and SB. SA represents a gap width between a left-hand side (with respect to the drawing sheet) boundary of the OD region 310 and the left-most finger 320a of the gate structure. SB represents a gap width between a right-hand side boundary of the OD region 310 and the right-most finger 320c of the gate structure.

WPE geometric parameters include parameters SC_L, SC_R, SC_T, and SC_B. SC_L represents a gap width between the left-most finger 320a of the gate structure and a left-hand side boundary of the well region boundary 340. SCR represents a gap width between the right-most finger 320c of the gate structure and a right-hand side boundary of the well region boundary 340. SC_T represents a gap width between a top boundary of the OD region 310 and a top boundary of the well region boundary 340. SC_B represents a gap width between a bottom boundary of the OD region 310 and a bottom boundary of the well region boundary 340.

PSE geometric parameters include parameters SPA_L, SPB_L, SPAR, and SPB_R. SPA_L represents a gap width between the left-most finger 320a and a closest neighboring polysilicon structure 330a to the left of the gate structure. SPB_L represents a gap width between the left-most finger 320a of the gate structure and a next neighboring polysilicon structure 330b to the left of the gate structure. SPAR represents a gap width between the right-most finger 320c and a closest neighboring polysilicon structure 330c to the right of the gate structure. SPB_R represents a gap width between the right-most finger 320c of the gate and a next neighboring polysilicon structure 330d to the right of the gate structure.

OSE geometric parameters include parameters SFAX_L, SFAX_R, SFY_T, and SFY_B. SFAX_L represents a gap width between the left-most finger 320a and a closest neighboring OD region of the other surrounding OD regions 360 to the left of the gate structure. SFAX_R represents a gap width between the right-most finger 320c and a closest neighboring OD region of the other surrounding OD regions 360 to the right of the gate structure. SFY_T represents a gap width between a top boundary of the OD region 310 and a closest neighboring OD region of the other surrounding OD regions 360 to the top of the OD region 310. SFY_B represents a gap width between a bottom boundary of the OD region 310 and a closest neighboring OD region of the other surrounding OD regions 360 to the bottom of the OD region 310.

BE geometric parameters include ENX_L, ENX_R, ENY_T, ENY_B, RX_L, EX_R, RY_T, and RY_B. ENX_L represents a gap width between the left-most finger 320a and a left-hand side boundary of the CESL boundary 350. ENX_R represents a gap width between the right-most finger 320c and a right-hand side boundary of the CESL boundary 350. ENY_T represents a gap width between the top boundary of the OD region 310 and a top boundary of the CESL boundary 350. ENY_B represents a gap width between the bottom boundary of the OD region 310 and a bottom boundary of the CESL boundary 350.

Moreover, RX_L represents a gap width between the left-most finger 320a and a closest one of the other surrounding CESL boundaries 370 to the left of the gate structure. RX_R represents a gap width between the right-most finger 320c and a closest one of the other surrounding CESL boundaries 370 to the right of the gate structure. RY_T represents a gap width between the top boundary of the OD region 310 and a closest one of the other surrounding CESL boundaries 370 to the top of the OD region 310. RY_B represents a gap width between the bottom boundary of the OD region 310 and a closest one of the other surrounding CESL boundaries 370 to the bottom of the OD region 310.

Other layout geometry parameters include parameters SD, L, and W. SD represents a gap width between two neighboring polysilicon structures 320a/320b or 320b/320c of the gate structure. L represents the width of the polysilicon structures 320a, 320b, and 320c (i.e., the gate length of the gate structure). W represents the width of the OD region 310 (i.e., the gate width of each finger of the gate structure). In some embodiments, additional layout geometry parameters are also defined and used. In some embodiments, not all above-mentioned layout geometry parameters are used or made usable.

Figure 4A:
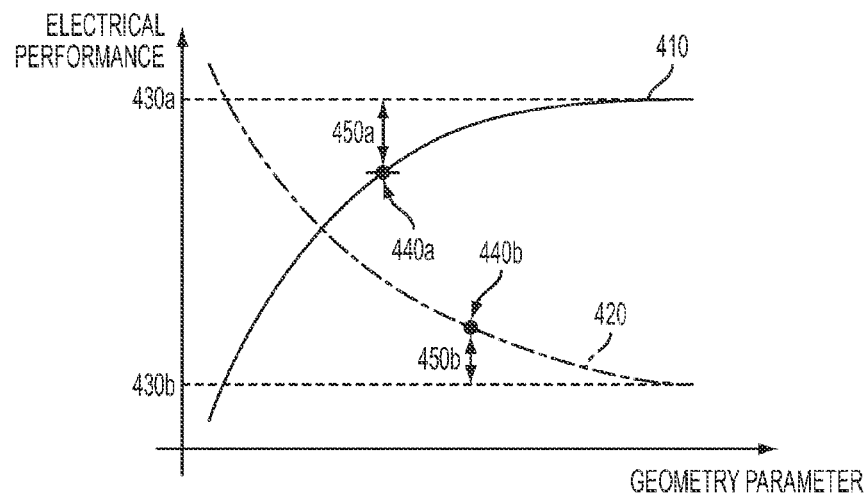
FIGS. 4A and 4B are charts of the relation between one or more layout geometry parameter and a preselected electrical performance parameter in accordance with one or more embodiments.

FIG. 4A is a chart of a layout geometry parameter versus an electrical performance parameter in accordance with one or more embodiments. In at least one embodiment, at least one electrical performance parameter increases if a geometry parameter being evaluated increases (as represented by curve 410), and at least one electrical performance parameter decreases if a geometry parameter being evaluated increases (as represented by curve 420). For example, for an example P-channel MOS transistor, a device current increases when the layout geometry parameter SPA_L increases, and the device current decreases when the geometry parameter SA increases.

In general, the impact caused by the layout-dependent effects becomes less significant with the increase of one or more of the above-mentioned gap widths. When a layout geometry parameter being evaluated becomes infinite, the electrical performance parameter reaches a reference value 430a or 430b. In operation 122 depicted in FIG. 1, in some embodiments, at least one geometry parameter is set to be greater than a saddle point value 440a or 440b, where the saddle point value 440a or 440b corresponds to a value that is within a predetermined percentage of variation 450a or 450b compared with the corresponding reference value 430a or 430b. In some embodiments, the predetermined percentage of variation 450a or 450b is 1~3%.

Figure 4B:
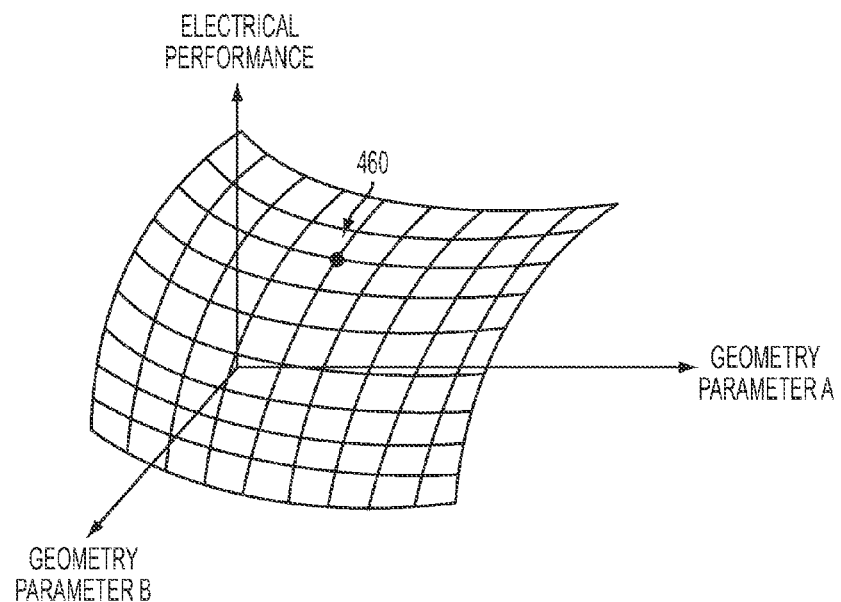

FIG. 4B is a chart of two layout geometry parameters versus an electrical performance parameter in accordance with one or more embodiments. Compared with the chart in FIG. 4A, two layout geometry parameters (Geometry Parameter A and Geometry Parameter B) are being evaluated with regard to a selected electrical performance parameter. In some embodiments, Geometry Parameter A and Geometry Parameter B are set to be greater than the values at a saddle point 460 that corresponds to a value of the selected electrical performance parameter within a predetermined percentage of variation compared with the corresponding reference value when the geometry parameters being evaluated are infinite. In some embodiments, the predetermined percentage of variation is 1~3%. In some embodiments, more than two layout geometry parameters are evaluated simultaneous with respect to the same electrical performance parameter.

In some embodiments, the controller 710, in operation 122, also receives layout preference information with the circuit design 112. In some embodiments, some of the layout geometry parameters are generated based on the received layout preference information. In at least one embodiment, if there is a conflict between a layout geometry parameter derived from, for example, a saddle point analysis and the received layout preference information, the determined layout geometry parameter overrides the received layout preference information.

In some embodiments, operation 122 of FIG. 1 further generates a layout geometry parameter that includes a set of indices indicating how a declared transistor is arranged with respect to a neighboring transistor.

Figure 5A:
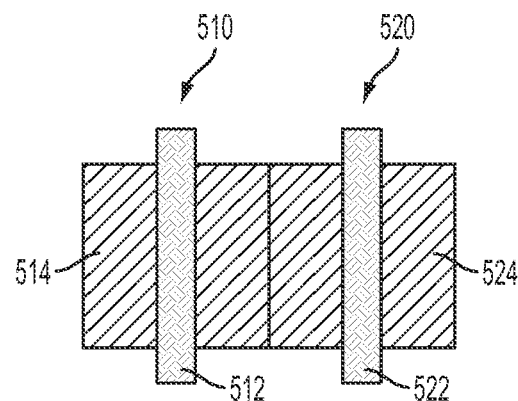
FIGS. 5A-5C are top-view diagrams of two transistors having different layout arrangements in accordance with one or more embodiments.
Figure 5B:
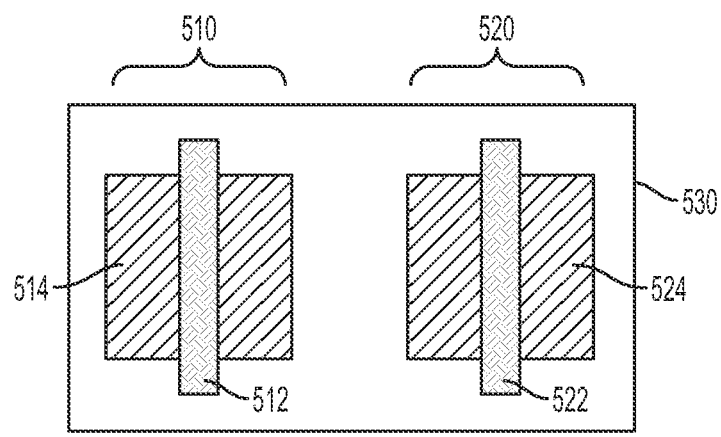
Figure 5C:
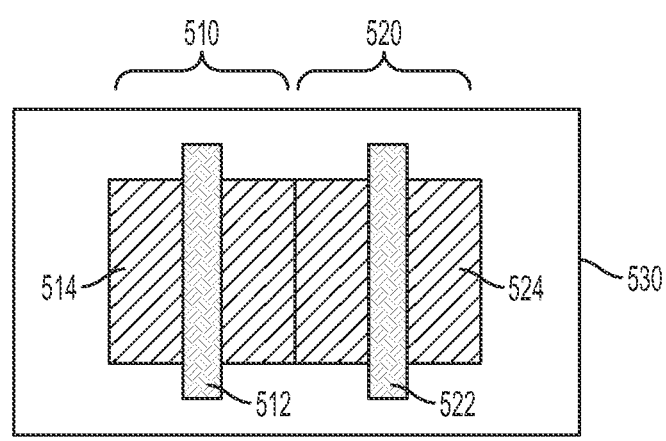

FIGS. 5A-5C are top-view diagrams of two transistors 510 and 520 having different physical arrangements in accordance with one or more embodiments. Transistor 510 includes a gate 512 and an OD region 514; and transistor 520 includes a gate 522 and an OD region 524. Depending on the type of substrate for forming the transistors 510 and 520 and the type of the transistors 510 and 520, in some embodiments, transistors 510 and 520 are formed within a well region 530. In some embodiments, the layout arrangement of two neighboring transistors 510 and 520 includes at least four possible configurations: 1) OD abutment without well-sharing (FIG. 5A); 2) well-sharing without OD abutment (FIG. 5B); 3) well-sharing and OD abutment (FIG. 5C); and 4) none of the above.

In some embodiments, the set of indices includes Index_abt, Index_nw, and Index_abt_nw each being set to be either 1 or 0. The above-mentioned scenarios 1) through 3) are recorded by setting one of the set of indices Index_abt, Index_nw, and Index_abt_nw to a value of 1. Index_abt, Index_nw, and Index_abt_nw, when all set to 0, represent the above-mentioned scenario 4). In some embodiments, the set of indices further includes an indicator identifying whether the declared transistor is identified, for layout generation purposes, as the primary transistor (master device) or the secondary transistor (slave device), and a direction from the primary transistor to the secondary transistor.

For example, the set of layout geometry parameters for the transistors M1 and M2 in FIG. 2 includes the description as follows:

*M1
*Index_abt=1 Index_nw=0 Index_abt_nw=0 master right
*SC_L=100n SC_R=100n SC_T=150n SC_B=150n SPA_L=200n
*SPBL=300n SPA_R=200n SPB_R=300n
*M2
*Indexabt=1 Index_nw=0 Index_abt_nw=0 slave—
*SCL=100n SC_R=100n SC_T=150n SC_B=150n SPA_L=200n
*SPBL=300n SPA_R=200n SPB_R=300n Therefore, for layout generation purposes, transistor M1 is identified as a primary transistor, transistor M2 is identified as a secondary transistor placed on the right-hand side of the transistor M1, and the OD regions of transistor M1 and M2 are adjacent to each other.

Moreover, after the performance of the operation 124 in FIG. 1, a portion of the consolidated netlist corresponding to the transistors M1 and M2 depicted in FIG. 2 includes:

M1 (net01 net01 net02 net03) nch_mac 1=80n w=240.0n multi=1 nf=1 sd=140.0n ad=2.64e-14 as=2.64e-14 pd=700n ps=700n nrd=0.386341 nrs=0.386341
*Index_abt=1 Index_nw=0 Index_abt_nw=0 master right
*SC_L=100n SC_R=100n SC_T=150n SC_B=150n SPA_L=200n
*SPBL=300n SPA_R=200n SPB_R=300n
M2 (net04 net01 net02 net03) nch_mac 1=80n w=1.2u multi=1 nf=5 sd=140.0n ad=9.36e-14 as=9.36e-14 pd=2.22u ps=2.22u nrd=0.082297 nrs=0.082297
*Indexabt=1 Index_nw=0 Index_abt_nw=0 slave—
*SCL=100n SC_R=100n SC_T=150n SC_B=150n SPA_L=200n
*SPBL=300n SPA_R=200n SPB_R=300n In at least one embodiment, the consolidated netlist for the integrated circuit 200 in FIG. 2 will be recognized by the predetermined simulation software program as a simplified version of the original netlist, because all LDE-related parameters recognizable by the simulation software program have been omitted. Meanwhile, the consolidated netlist also contains detail information for defining the requirements for preparing the circuit layout of the integrated circuit 200.

FIG. 6A is a top-view diagram of an example multi-finger transistor 610 in accordance with one or more embodiments. The multi-finger transistor 610 has three parallel gate electrodes (i.e., fingers) 612a, 612b, and 612c over an OD region 614. FIG. 6B is a top-view diagram of three single-finger transistors 620a-620c derived from the example multi-finger transistor 610 of FIG. 6A in accordance with one or more embodiments. As depicted in FIG. 1 and FIGS. 6A-6B, in operation 130, the description in the consolidated netlist modeling the multi-finger transistor 610 is replaced with description modeling the three single-finger transistor 620a-620c in a decomposed consolidated netlist.

In some embodiments, the decomposition of the multi-finger transistor 610 includes generating description for modeling single-finger transistors 620a-620c each retaining a corresponding one of the fingers 612a-612c of the multi-finger transistor 610 over an OD region 624a, 624b, and 624c having the same size as the OD region 614 of the multi-finger transistor 610. The layout geometry parameters are thus recalculated for these equivalent single-finger transistors 620*a*-620*c*. In some embodiments, the recalculation of the layout geometry parameters for the equivalent single-finger transistors 620*a*-620*c* includes calculating the geometry dimensions based on the value of the layout geometry parameters of the multi-finger counterpart 610.

Returning to the example integrated circuit 200 depicted in FIG. 2 and corresponding example consolidated netlist presented above, the transistor M2 has five fingers ("nf=5"). Therefore, in operation 130, the description for modeling transistor M2 will be replaced with description for modeling five parallel-connected single-finger transistors in a decomposed consolidated netlist.

Table I lists example LDE-related instance parameters according to BSIM standard that are calculated based on the corresponding layout geometry parameters listed at the same row.

TABLE I

| | Layout geometry parameters | BSIM LDE-related instance parameters |
|---|---|---|
| LOD | SA, SB | SA, SA1, SA2, SA3, SB, SB1, SB2, SB3 |
| WPE | SC_L, SC_R, SC_T, SC_B | SCA, SCB, SCC |
| PSE | SPA_L, SPA_R, SPB_L, SPB_R | SPA, SPA1, SPA2, SPA3, SAP, SA4, SPBA, SPBA1, SAPB |
| OSE | SFAX_L, SFAX_R, SFY_T, SFY_B | SODX, SODX1, SODX2, SODY, SA5, SA6 |
| BE | ENX_L, ENX_R, ENY_T, ENY_B, RX_L, RX_R, RY_T, RY_B | ENX, ENX1, ENY, ENY1, ENY2, REX, REY |

For example of LOD:

$$\frac{1}{SA_{Re\text{-}calculate} + 0.5 \times L} = \sum_{i=1}^{n} \frac{1}{SA_i + 0.5 \times L},$$

where $SA_{Re\text{-}calculate}$ is re-calculated result with finger number un-equal to 1 of BSIM LDE instance parameter, n is finger number, L is the gate-length, $SA_i$ is the length of OD diffusion of "de-composed" single-finger transistor.

Figure 7:
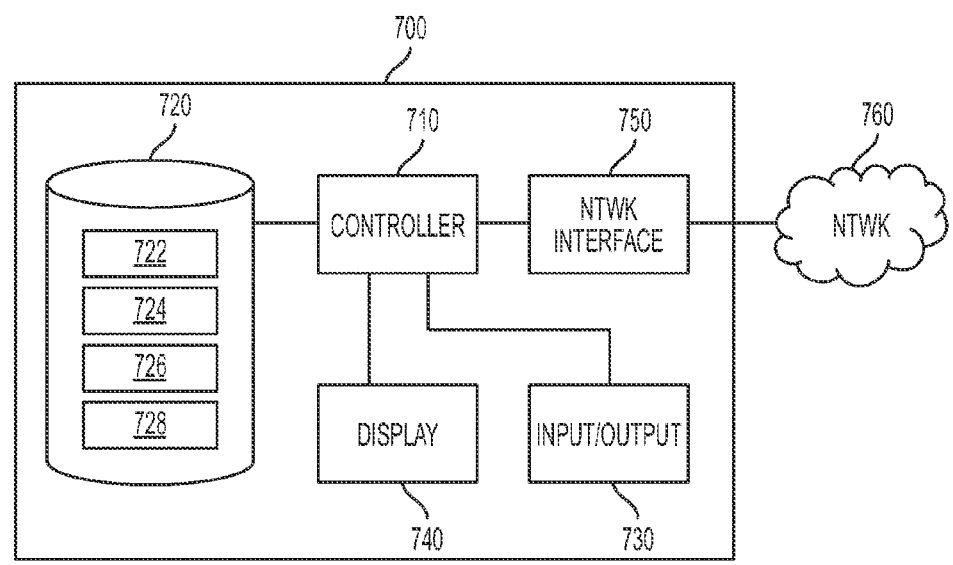
FIG. 7 is a functional block diagram of a computer system usable for implementing the method disclosed in FIG. 1 in accordance with one or more embodiments.

FIG. 7 is a functional block diagram of a computer system 700 usable for implementing the method disclosed in FIG. 1 in accordance with one or more embodiments.

Computer system 700 includes the hardware controller 710 and a non-transitory, computer readable storage medium 720 encoded with, i.e., storing, the computer program code 722, i.e., a set of executable instructions. The controller 710 is electrically coupled to the computer readable storage medium 720. The controller 710 is configured to execute the computer program code 722 encoded in the computer readable storage medium 720 in order to cause the computer 700 to be usable as a Electronic Design Automation tool for performing the generation of the consolidated netlist, the pre-layout simulation, the layout generation, and/or the post-layout simulation, as depicted in FIG. 1.

In some embodiments, the controller 710 is a central processing unit (CPU), a multi-processor, a distributed processing system, an application specific integrated circuit (ASIC), and/or a suitable processing unit.

In some embodiments, the computer readable storage medium 720 is an electronic, magnetic, optical, electromagnetic, infrared, and/or a semiconductor system (or apparatus or device). For example, the computer readable storage medium 720 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 720 includes a compact disk-read only memory (CD-ROM), a compact disk-read/write (CD-R/W), and/or a digital video disc (DVD).

In some embodiments, the storage medium 720 stores the computer program code 722 configured to cause the computer system 700 to perform a method as depicted in FIG. 1. In some embodiments, the storage medium 720 also stores information needed for performing the method 100 or generated during performing the method 100, such as an original netlist 724, a consolidated netlist 726, and/or data for analyzing saddle points 728.

The computer system 700 includes, in at least some embodiments, an input/output interface 730 and a display 740. The input/output interface 730 is coupled to the controller 710 and allows the circuit designer or a simulation model designer to manipulate the computer system 700 in order to perform the method depicted in FIG. 1. In at least some embodiments, the display 740 displays the status of operation of the method depicted in FIG. 1 in a real-time manner and preferably provides a Graphical User Interface (GUI). In at least some embodiments, the input/output interface 730 and the display 740 allow an operator to operate the computer system 700 in an interactive manner.

In at least some embodiments, the computer system 700 also includes a network interface 750 coupled to the controller 710. The network interface 750 allows the computer system 700 to communicate with a network 760, to which one or more other computer systems are connected. The network interface includes wireless network interfaces such as BLUETOOTH, WIFI, WIMAX, GPRS, or WCDMA; or wired network interface such as ETHERNET, USB, or IEEE-1394. In some embodiments, the method of FIG. 1 is implemented in two or more computer systems 700 of FIG. 7, and information such as the original netlist, the consolidated netlist, the circuit layout, and/or other information are exchanged between different computer systems via the network 760.

In accordance with one embodiment, a method of generating a circuit layout of an integrated circuit includes generating layout geometry parameters for at least a predetermined portion of an original netlist of the integrated circuit. A consolidated netlist including information from the original netlist and the layout geometry parameters is generated. Then, the circuit layout is generated based on the consolidated netlist.

In accordance with another embodiment, a method of performing a circuit simulation for an integrated circuit prior to generation of circuit layout of the integrated circuit includes generating layout geometry parameters for at least a predetermined portion of an original netlist of the integrated circuit. A consolidated netlist is generated according to the original netlist and the layout geometry parameters. A modified netlist is generated based on the consolidated netlist, and the modified netlist is recognizable by a simulation software program. Then, by executing the simulation software program, the circuit simulation is performed based on the modified netlist.

In accordance with yet another embodiment, a non-transitory computer readable storage medium is encoded with a computer program code. The computer program code is arranged to cause a hardware controller to generate layout geometry parameters for at least a predetermined portion of an original netlist of the integrated circuit, and to generate a consolidated netlist according to the original netlist and the layout geometry parameters. The layout geometry parameters include length of diffusion geometric parameters, well proximity effect geometric parameters, poly space effect geometric parameters, oxide diffusion (OD) space effect geometric parameters, or boundary effect geometric parameters.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of generating a circuit layout of an integrated circuit, the method performed by a hardware controller, the method comprising:
   generating layout geometry parameters for at least a predetermined portion of an original netlist of the integrated circuit, wherein the predetermined portion of the integrated circuit comprises at least a multi-finger transistor;
   generating a consolidated netlist by combining the original netlist and the layout geometry parameters;
   replacing a description for modeling the multi-finger transistor with a description for modeling a plurality of single-finger transistors; and
   generating the circuit layout based on the consolidated netlist.

2. The method of claim 1, wherein the predetermined portion of the integrated circuit comprises at least two transistors, and the layout geometry parameters comprise a set of indices indicating whether the at least two transistors have an arrangement of oxide diffusion (OD) abutment or well sharing.

3. The method of claim 1, wherein the plurality of single-finger transistors each retains a corresponding one of gate electrodes of the multi-finger transistor over an oxide diffusion (OD) region having the same size as the one of the multi-finger transistor.

4. The method of claim 1, further comprising performing a pre-layout simulation based on the consolidated netlist, wherein the pre-layout simulation is performed by executing a simulation software program, and the layout geometry parameters are recognizable by the simulation software program.

5. The method of claim 1, further comprising:
   generating a modified netlist including a set of layout-dependent effect related (LDE-related) instance parameters recognizable by a simulation software program based on the consolidated netlist; and
   performing a pre-layout simulation by executing the simulation software program based on the modified netlist.

6. The method of claim 5, wherein the generation of the modified netlist comprises calculating the set of LDE-related instance parameters recognizable by the simulation software program according to the layout geometry parameters.

7. The method of claim 1, further comprising, after the performance of the pre-layout simulation, determining if a discrepancy between a result of the pre-layout simulation and a set of predetermined performance targets is greater than a predetermined tolerance.

8. The method of claim 7, further comprising modifying the layout geometry parameters after a determination that the discrepancy between a result of the pre-layout simulation and set of predetermined performance targets is greater than the predetermined tolerance.

9. The method of claim 1, wherein the generation of the layout geometry parameters comprises setting at least one of the layout geometry parameters to be greater than a saddle point value, the saddle point value corresponding to an electrical performance parameter value within a predetermined percentage of variation compared with a reference value of the electrical performance parameter if the at least one of the layout geometry parameters is set to be infinite.

10. The method of claim 9, wherein the predetermined percentage of variation is 1~3%.

11. The method of claim 1, further comprising:
    performing a pre-layout simulation based on the consolidated netlist;
    extracting a set of layout-dependent effect (LDE) parameters based on the circuit layout;
    performing a post-layout simulation based on the LDE parameters;
    determining, after the performance of the post-layout simulation, if discrepancy between a result of the post-layout simulation and a result of the pre-layout simulation is greater than a predetermined tolerance; and
    revising the circuit layout after a determination that the discrepancy between the result of the post-layout simulation and the result of the pre-layout simulation is greater than the predetermined tolerance.

12. The method of claim 1, further comprising:
    receiving layout preference information; and
    generating the layout geometry parameters based on the layout preference information.

13. The method of claim 1, wherein the layout geometry parameters comprise length of diffusion geometric parameters, well proximity effect geometric parameters, poly space effect geometric parameters, oxide diffusion (OD) space effect geometric parameters, or boundary effect geometric parameters.

14. A method of performing a circuit simulation for an integrated circuit, the method performed by a hardware controller prior to generation of a circuit layout of the integrated circuit, the method comprising:
    generating layout geometry parameters for at least a predetermined portion of an original netlist of the integrated circuit, wherein the predetermined portion of the integrated circuit comprises at least a multi-finger transistor;
    generating a consolidated netlist by combining the original netlist and the layout geometry parameters;
    decomposing the multi-finger transistor into a plurality of single-finger transistors in the consolidated netlist;
    generating a modified netlist based on the consolidated netlist, the modified netlist being recognizable by a simulation software program; and
    performing, by executing the simulation software program, the circuit simulation based on the modified netlist.

15. The method of claim 14, wherein the generation of the modified netlist comprises calculating a set of layout-dependent effect related (LDE-related) instance parameters recognizable by the simulation software program according to the layout geometry parameters.

16. The method of claim 14, wherein the layout geometry parameters comprises length of diffusion geometric parameters, well proximity effect geometric parameters, poly space effect geometric parameters, oxide diffusion (OD) space effect geometric parameters, or boundary effect geometric parameters.

17. The method of claim 14, wherein the plurality of single-finger transistors each retains a corresponding one of gate electrodes of the multi-finger transistor over an oxide diffusion (OD) region having the same size as the one of the multi-finger transistor.

18. A non-transitory computer readable storage medium encoded with a computer program code, the computer program code being arranged to cause a hardware controller to:
generate layout geometry parameters for at least a predetermined portion of an original netlist of an integrated circuit, the layout geometry parameters comprising length of diffusion geometric parameters, well proximity effect geometric parameters, poly space effect geometric parameters, oxide diffusion (OD) space effect geometric parameters, or boundary effect geometric parameters; and
generate a consolidated netlist by combining the original netlist and the layout geometry parameters, wherein the generation of the consolidated netlist comprises replacing layout-dependent effect related (LDE-related) instance parameters in the original netlist with the layout geometry parameters to obtain the consolidated netlist;
wherein the predetermined portion of the integrated circuit comprises at least a multi-finger transistor, the computer program code being arranged to further cause the controller to decompose the multi-finger transistor into a plurality of single-finger transistors in a decomposed consolidated netlist.

19. The non-transitory computer readable storage medium of claim 18, wherein the computer program code being arranged to further cause the controller to:
calculate a new set of LDE-related instance parameters according to the layout geometry parameters, the new set of LDE-related instance parameters recognizable by a simulation software program.

20. The non-transitory computer readable storage medium of claim 18, wherein the plurality of single-finger transistors each retains a corresponding one of gate electrodes of the multi-finger transistor over an oxide diffusion (OD) region having the same size as the one of the multi-finger transistor.

* * * * *